US009080703B2

(12) United States Patent
Legendre

(10) Patent No.: US 9,080,703 B2
(45) Date of Patent: Jul. 14, 2015

(54) CONNECTING DEVICE TO BE CONNECTED TO AT LEAST ONE PIPE

(75) Inventor: Christophe Legendre, Virandeville (FR)

(73) Assignee: Electricite de France, Paris (FR)

( * ) Notice: Subject to any disclaimer, the term of this patent is extended or adjusted under 35 U.S.C. 154(b) by 227 days.

(21) Appl. No.: 13/883,427

(22) PCT Filed: Oct. 31, 2011

(86) PCT No.: PCT/FR2011/052553
§ 371 (c)(1),
(2), (4) Date: May 3, 2013

(87) PCT Pub. No.: WO2012/059684
PCT Pub. Date: May 10, 2012

(65) Prior Publication Data
US 2013/0221661 A1 Aug. 29, 2013

(30) Foreign Application Priority Data
Nov. 4, 2010 (FR) ...................................... 10 59101

(51) Int. Cl.
*B23P 19/04* (2006.01)
*F16L 25/12* (2006.01)
*F16L 37/00* (2006.01)

(52) U.S. Cl.
CPC ............... *F16L 25/12* (2013.01); *F16L 37/002* (2013.01)

(58) Field of Classification Search
USPC ................ 29/238, 890.14, 890.144
See application file for complete search history.

(56) References Cited

U.S. PATENT DOCUMENTS

| 3,674,292 A * | 7/1972 | Demler, Sr. ............... 285/148.18 |
| 4,078,832 A * | 3/1978 | Wittman ........................... 285/18 |
| 4,767,136 A | 8/1988 | Lehmann |
| 5,979,487 A | 11/1999 | Devehat |
| 6,324,917 B1 * | 12/2001 | Mack et al. ................. 73/861.52 |
| 2005/0046178 A1 | 3/2005 | Sato et al. |
| 2009/0289453 A1 | 11/2009 | Sauer |

FOREIGN PATENT DOCUMENTS

| CN | 2120243 U | 10/1992 |
| CN | 2199395 Y | 5/1995 |
| CN | 1152291 A | 6/1997 |
| CN | 1590827 A | 3/2005 |

(Continued)

OTHER PUBLICATIONS

English Translation of Office Action issued for JP 2013-537183 (May 7, 2014).

(Continued)

*Primary Examiner* — Lee D Wilson
*Assistant Examiner* — Shantese McDonald
(74) *Attorney, Agent, or Firm* — Drinker Biddle & Reath LLP

(57) ABSTRACT

A connecting device comprising at least a telescopic connecting system mounted on a carrier housing and capable of being actuated by an actuating mechanism for deployment and connection to a pipe. The telescopic connecting system is connected to a first portion of the actuating mechanism arranged inside the carrier housing and the actuating mechanism comprises a control rod crossing at least one wall of the carrier housing and connecting said first portion to a control system arranged on the outside of the carrier housing.

13 Claims, 2 Drawing Sheets

(56) References Cited

FOREIGN PATENT DOCUMENTS

| | | |
|---|---|---|
| DE | 19 62 746 U | 6/1967 |
| EP | 0 544 947 A1 | 6/1993 |
| GB | 1143905 A | 2/1969 |
| JP | S50-45698 Y1 | 12/1975 |
| JP | S52-49912 U | 4/1977 |
| JP | H01-26953 Y2 | 8/1989 |
| JP | H03-100681 U | 10/1991 |
| JP | H04-194491 A | 7/1992 |
| JP | H06-241380 A | 8/1994 |
| JP | 2592145 B2 | 3/1997 |
| JP | 2000-055235 | 2/2000 |
| JP | 2003-194011 A | 7/2003 |
| JP | 2008-215520 A | 9/2008 |

OTHER PUBLICATIONS

English Translation of Office Action issued for CN 2011180062232.4 (Sep. 12, 2014).
Copy of Office Action issued for JP 2013-537183 (Mar. 2, 2015).

* cited by examiner

CONNECTING DEVICE TO BE CONNECTED TO AT LEAST ONE PIPE

CROSS-REFERENCE TO RELATED APPLICATIONS

This application is the U.S. national phase of the International Patent Application No. PCT/FR2011/052553 filed Oct. 31, 2011, which claims the benefit of French Application No. 10 59101 filed Nov. 4, 2010, the entire content of which is incorporated herein by reference.

FIELD

The present invention relates to a connecting device to be connected to at least one pipe, in particular, a pipe located in a hostile environment, comprising at least one telescopic connecting system mounted on a carrier housing and capable of being actuated along a translational axis by an actuating mechanism for deployment and connection to said pipe.

BACKGROUND

A connecting device of this type is known from patent FR 1,536,180, which discloses a system of two opposing telescopic tubular elements actuated by a hydraulic or pneumatic actuating mechanism. The actuating mechanism comprises pistons mounted in bore holes of a carrier housing and arranged so as to push the tubular elements toward the exterior of the housing. The tubular elements are connected to one another in such a way that they provide a seal when a bellows is applied. The system can enable communication between two remote pipes by being installed and controlled by a robot capable of providing pressurized fluid to the actuating mechanism. The connection between the two pipes can, therefore, occur without human intervention in the immediate vicinity, which is advantageous in a hostile environment, such as the kind of radioactive environment found within the enclosure housing a nuclear reactor.

Nonetheless, this known connecting device presents several disadvantages. In particular, the actuating mechanism is complex because it requires four pairs of opposed pistons distributed circumferentially between two clamps interconnected by extension springs in such a way that the vector sum of the forces exercised on a telescopic element is directed along the element's axis of translation. Additionally, maintaining a connecting position is dependent on the pressure in the hydraulic or pneumatic circuit of the actuating mechanism, which presents problems of reliability, not to mention the fact that a possible leak of pressurized fluid risks contaminating the environment in the vicinity of the device. Moreover, a device of this design requires that the pipes have flared openings in order to effect a tight connection and is not suitable for connecting more than two remote pipes.

The present invention is intended to correct the above drawbacks and, in particular, to provide a connecting device having a simpler, more reliable actuating mechanism capable of avoiding any risk of environmental contamination.

SUMMARY

To this end, the object of the invention is a connecting device as defined above, characterized in that the said telescopic connection system is connected to a first portion of said actuating mechanism arranged within said carrier housing and in that said actuating mechanism comprises a control rod that crosses at least one wall of the carrier housing and connects said first portion of the actuating mechanism to a control system arranged outside said carrier housing.

By means of these arrangements, the connection between a telescopic system and the actuating mechanism is realized within the carrier housing. Because of this, a portion of the actuating mechanism can be arranged in the axial extension of the telescopic system, thereby enabling a relatively compact actuating mechanism to be designed that can advance or withdraw a telescopic element by exercising forces upon it that are substantially directed along the element's axis of translation. Additionally, through the control rod, a hydraulic or pneumatic actuating mechanism is no longer required, which, in particular, avoids the risks associated with the leakage of a control fluid and increases the reliability of maintaining a connecting position.

In the preferred embodiments of a connecting device according to the invention, any of the following arrangements are used:

at least one said telescopic connecting system comprises an interior channel suitable for the passage of fluid between the pipe to which it is connected and an interior space of said carrier housing, which enables said pipe and the interior of the housing to communicate in fluidic fashion and, where several pipes are to be connected, enables the pipes to communicate with one another by means of the connecting device;

at least one said telescopic connecting system is suitable for substantially obstructing the pipe to which it is connected, which results in a connecting device capable of completely or partially obstructing at least one pipe to which the device is connected;

said actuating mechanism comprises a unique said first portion suitable for jointly actuating several said telescopic connecting systems, which simplifies the actuating mechanism and reduces its size;

said control rod sealingly crosses at least one wall delimiting said interior space of the carrier housing, which prevents fluid from a pipe that circulates inside the carrier housing from escaping into the environment;

said control rod extends along a rod axis appreciably perpendicular to the axis of translation of each telescopic connecting system and is free to rotate around its rod axis, which is advantageous in terms of the volume of the mechanism and the ability to sealingly traverse a wall of the housing;

said first portion of the actuating mechanism comprises a hub that rotates integrally with said control rod, said hub being mechanically connected to translationally moving elements of said telescopic connecting systems by articulated connecting rods, which is advantageous in terms of the simplicity and volume of the mechanism;

at least one said telescopic connecting system comprises a tubular element movable in translation and equipped with an inflatable seal, which enables a sealing connection to be realized between the telescopic tubular element and the corresponding pipe without being dependent on the configuration of the mouth of the pipe; for example, it is not necessary to have a flared mouth, as is the case with the known device mentioned in the introduction;

said tubular element presents an external diameter smaller than the internal diameter of a pipe to which it can be connected, and said inflatable seal is mounted on an external surface of said tubular element, which is suitable for a variety of pipe mouth configurations;

said inflatable seal is supplied with fluid from a piping circuit comprising a flexible portion arranged in said carrier housing or in its proximity, said piping circuit also comprising an external portion arranged outside said carrier housing and appreciably extending parallel to said control rod, which enables the seal to be inflated with a gas or fluid supplied from a pump that can be installed at a distance from the carrier housing;

the connecting device also comprises a positioning and guidance system comprising a frame suitable for supporting said carrier housing;

said control system comprises a motor unit supported by said frame and suitable for rotationally actuating said control rod;

said positioning and guidance system comprises telescopic positioning legs supporting said frame and equipped with remotely activated actuators capable of moving said frame in an appreciably vertical direction.

BRIEF DESCRIPTION OF THE DRAWINGS

Other characteristics and benefits shall be made clear from the following description of non-limiting examples of embodiments, which refer to the figures, wherein.

DETAILED DESCRIPTION

Figure 1:
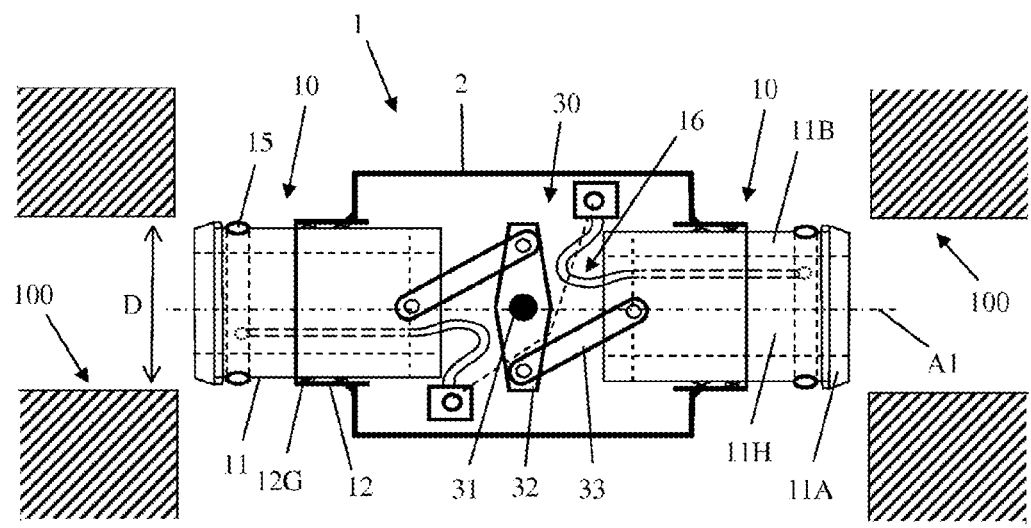
FIG. 1 schematically represents a partial top view of a horizontal cutaway of a connecting device according to a first embodiment of the invention, wherein the device is ready to be deployed to connect two pipes.

Connecting device 1, schematically represented in FIG. 1, is installed between two remote pipes 100 that we wish to connect to one another or wish to substantially block. It comprises two telescopic connecting systems 10 that extend along the same longitudinal axis A1 in opposite directions and are mounted on the same carrier housing 2. Each telescopic connecting system 10 comprises a fixed tubular guide element 12 integral with housing 2 and a movable tubular element 11 capable of translationally sliding inside tubular guide element 12 along axis A1. A sealing contact is procured between tubular elements 11 and 12 of telescopic system 10 by means of seals 12G mounted on an interior surface of tubular guide element 12.

Movable tubular element 11 of each telescopic system 10 can be translationally actuated along axis A1 by actuating mechanism 3, which comprises a first portion 30 disposed inside carrier housing 2. This first portion 30 comprises shared hub 32 and two articulated connecting arms 33 that mechanically connect hub 32 to each movable tubular element 11. Actuating mechanism 3 comprises a second portion that comprises control system 35 arranged on the outside of housing 2 and control rod 31 traversing a wall of housing 2 to connect first portion 30 to control system 35 (FIG. 3).

Figure 3:
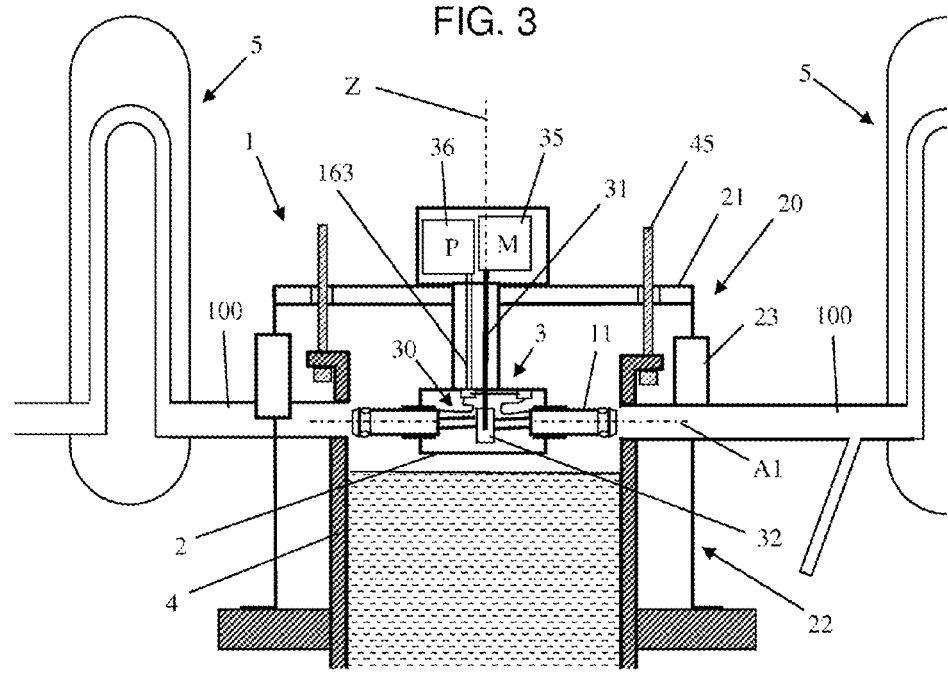
FIG. 3 schematically represents a side cutaway of the first embodiment of the connecting device, installed on a nuclear reactor vessel, wherein the device is ready to be connected to pipes in a primary cooling circuit of the reactor.

Control rod 31 extends along rod axis Z, appreciably perpendicular to the axis of translation A1 of each telescopic connecting system 10, and can rotate freely around its rod axis (FIG. 3). Control system 35 is suitable for rotationally actuating control rod 31 to rotationally drive hub 32 to displace articulated control rods 33 and, therefore, movable tubular elements 11. In the first embodiment shown, control rod 31 is affixed to the center of hub 32, the latter being rotationally integral with the rod; but it is also possible to provide an indirect connection between the rod and the hub, for example, by means of gears.

Each movable tubular element 11 advantageously presents a frontal portion 11A whose exterior surface is generally frustoconical and a principal portion 11B of generally cylindrical surface. The greatest diameter of frontal portion 11A is designed to be somewhat greater than the external diameter of principal portion 11B and somewhat smaller than the internal diameter D of pipe 100 to which tubular element 11 can be connected. In this manner, a front portion of each tubular element 11 can be introduced into corresponding pipe 100. In order to create a sealed connection, each tubular element 11 is equipped with at least one inflatable seal 15, arranged circumferentially and sealingly on the external surface of principal portion 11B in the vicinity of frontal portion 11A.

Advantageously, in its uninflated state, as shown in FIG. 1, the external diameter of inflatable seal 15 does not exceed the greatest diameter of frontal portion 11A, in such a way that it does not or almost does not cause the seal to rub against the internal wall of pipe 100 when tubular element 11 is introduced. Each inflatable seal 15 is supplied with fluid by piping circuit 16. The fluid may be a liquid or a gas, and a gas may be preferable to a liquid, in particular, to avoid any contamination of the environment by the liquid in the event of a leaking seal.

In the first embodiment shown, each telescopic connecting system 10 comprises an internal channel 11H formed in tubular element 11 and suitable for allowing fluid to pass between pipe 100, to which the telescopic system is connected, and an internal space of carrier housing 2. This allows pipes 100, to which connecting device 1 is connected, to communicate with one another. However, according to another embodiment, not shown, at least one of telescopic connecting systems 10 can be considered suitable for substantially blocking pipe 100 to which the telescopic system is connected. For example, the frontal portion 11A of tubular element 11 may present an occlusive frontal wall. Substantially blocking a pipe is understood to mean a blockage that may be total or partial. In the case of partial blocking, a small air bleed passage may be included that allows liquid to escape from pipe 100, for example, near a zone of inflatable seal 15 comprising a bleed opening.

Figure 2:
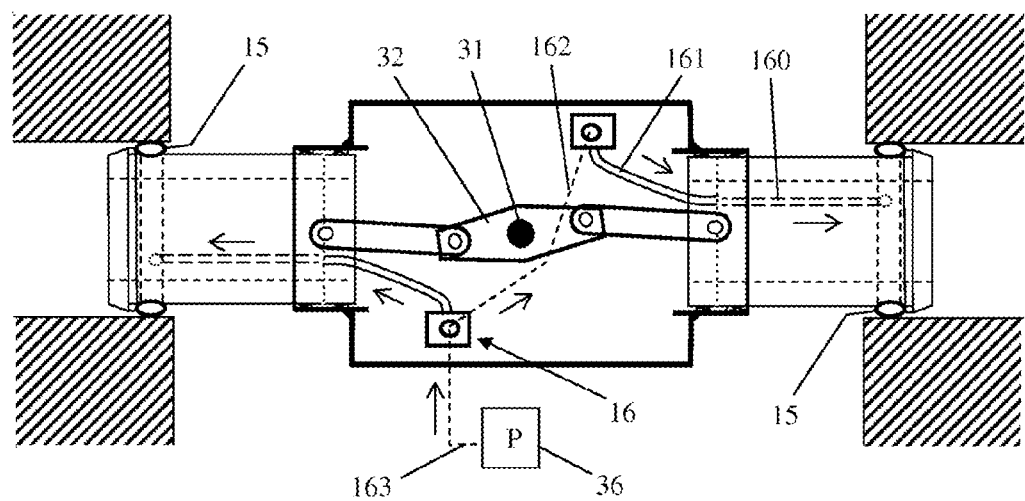
FIG. 2 schematically represents the device of FIG. 1 in a deployed position, in which the device is sealingly connected to two pipes.

As shown schematically in FIG. 2, hub 32 has been rotated 90°, or even slightly more than 90°, by the rotational action of control rod 31, which allows each of movable tubular elements 11 to be deployed for insertion in the opening of corresponding pipe 100. Once the insertion is complete, each inflatable seal 15 is inflated by bringing pressurized air through corresponding piping circuit 16 from pumping unit 36, situated outside carrier housing 2, as shown by the air circulation arrows in FIG. 2.

Each piping circuit 16 comprises a flexible portion 161 suitable for following the deployment of tubular element 11. This flexible portion 161 is extended by a straight portion 160 affixed to tubular element 11 and which is sealingly connected to inflatable seal 15. Each portion of flexible piping 161 can be arranged in carrier housing 2 or even outside and in the vicinity of this latter. The two piping circuits 16 communicate with one another through connecting piping 162 and comprise a shared external portion 163 arranged outside housing 2 and extending appreciably parallel to control rod 31 up to pumping unit 36. In this manner, inflatable seals 15 are inflated nearly simultaneously.

Each inflatable seal 15 is intended to come into sealing engagement with the interior wall of pipe 100, thereby enabling a sealing connection between connecting device 1 and pipes 100. In the first embodiment shown, pipes 100 communicate fluidly with one another by means of connecting device 1. Device 1 may be completely leakproof to prevent leakage into the environment of the liquid or gas transported by pipes 100, in which case control rod 31 must sealingly traverse at least one wall delimiting the interior space of carrier housing 2.

As shown schematically in FIG. 3, a connecting device 1 according to the first embodiment of FIG. 1 may advantageously be used for installation in a vessel 4 of a nuclear reactor in order to be connected to pipes of a primary circuit. A primary cooling circuit of a pressurized water reactor typically comprises several cooling loops each comprising a steam generator 5 as well as a hot branch and a cold branch connected to the vessel. In FIG. 3 is shown pipes 100 of two hot branches whose mouths, connected to vessel 4, are arranged opposite one another and aligned along the same axis A1. Connecting device 1 is intended to bring at least two hot branches into communication so they can be filled with water by injecting water into a single hot branch.

Connecting device 1 comprises positioning and guidance system 20 comprising frame 21 suitable for supporting housing 2. Frame 21 comprises telescopic positioning legs 22 equipped with actuators 23, which can be remotely actuated in order to remotely control movement of frame 21 in an appreciably vertical direction. Frame 21 comprises openings for its angular positioning with respect to the vessel. These openings are in positional correspondence with vertical studs 45, conventionally permanently mounted on vessel 4 for attaching the vessel cover. A swing bridge provided on the upper part of the reactor building may be used to position the vessel cover in order to angularly position connecting device 1 so that it then suffices to vertically lower frame 21 by controlling its altimetric position to bring tubular elements 11 into axial alignment with the mouths of pipes 11.

Control system 35, suitable for rotationally actuating control rod 31, comprises a motor unit supported by frame 21. Pump unit 36 can also be arranged to be supported by frame 21, but, alternatively, it can be moved to a platform located alongside the vessel to prevent, without difficulty, any risk of pump lubricant leaking into the vessel.

Figure 4:
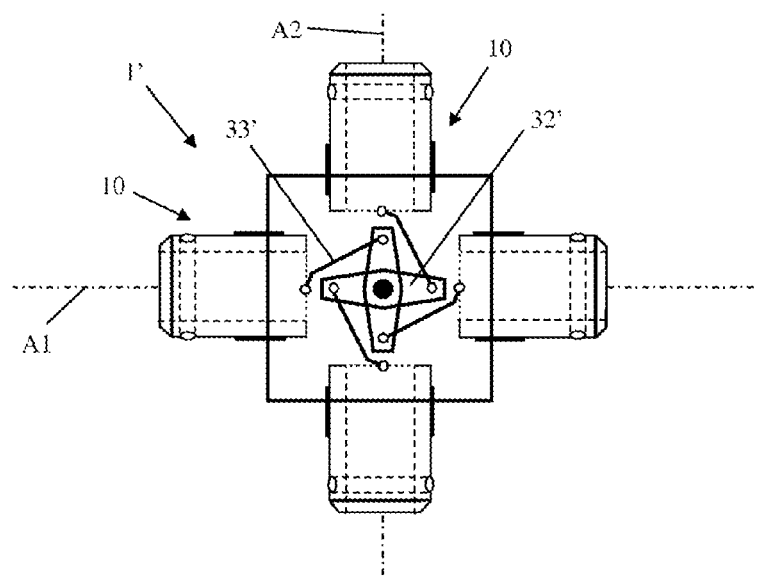
FIG. 4 schematically represents a partial top view of a horizontal cutaway of a connecting device according to a second embodiment of the invention, wherein the device is capable of being connected to four pipes.

A connecting device according to the invention is not limited to one or two telescopic systems 10 arranged along a single axis. Not only can two telescopic systems 10 on different axes be provided but more than two telescopic systems on at least two different axes. As shown schematically in FIG. 4, connecting device 1, according to a second embodiment of the invention, is suitable for being connected to four pipes arranged along two perpendicular axes A1 and A2. The connecting device comprises an actuating mechanism whose first portion arranged inside the carrier housing advantageously comprises shared hub 32' and four articulated rods 33' that mechanically connect the hub to each telescopic system 10.

A telescopic system of a connecting device according to the invention is not necessarily intended to be inserted inside the pipe to which it is connected. On the contrary, a telescopic system can be envisaged comprising a movable tubular element suitable for being pressed onto a tubular extremity of the pipe. If an inflatable seal is used for a sealing connection, the seal will then be mounted on an internal surface of the movable tubular element so as to establish sealing contact with an external surface of the tubular extremity of the pipe.

Of course, the invention is not limited to the use of an inflatable seal, and any type of seal, including a seal with rigid extendable elements, can be envisaged. Additionally, control rod 31 is not necessarily rotationally mobile, even if this arrangement provides advantages for providing a seal near the wall of housing 2 traversed by the rod. Alternatively, we can envisage a rod 31 movable in translation with articulated rods of the actuating mechanism, each of which is arranged, for example, on a plane formed by the Z axis of the rod and the axis of translation of corresponding telescopic system 10.

Moreover, in the case of a connecting device intended to be connected to a single pipe and, therefore, comprising a single telescopic system, it is possible to envisage a carrier housing communicating with a flexible or rigid fluid transport conduit in order, for example, to reroute fluid exiting the pipe toward a remote fluid recovery device. Such an embodiment can be useful in an underwater environment, for example, in order to collect oil escaping from a broken underwater pipe in a tanker, wherein the connecting device can be installed on the underwater pipe by means of remote-controlled robots.

The invention claimed is:

1. A connecting device for connection to at least one pipe and, in particular, a pipe located in a hostile environment, comprising at least one telescopic connecting system mounted on a carrier housing and suitable for actuation along an axis of translation by an actuating mechanism for deployment and connection to said pipe, wherein the telescopic connecting system is connected to a first portion of the actuating mechanism arranged within the carrier housing and the actuating mechanism comprises a control rod traversing at least one wall of the carrier housing and connecting the first portion to a control system arranged on the exterior of the carrier housing.

2. The connecting device according to claim 1, wherein the at least one telescopic connecting system comprises an interior channel suitable for allowing fluid to pass between the pipe to which it is connected and an interior space of the carrier housing.

3. The connecting device according to claim 1, wherein the at least one telescopic connecting system is suitable for substantially blocking the pipe to which it is connected.

4. The connecting device according to claim 1, wherein the actuating mechanism comprises a unique first portion suitable for actuating several telescopic connecting systems together.

5. The connecting device according to claim 1, wherein the control rod sealingly traverses at least one wall delimiting the interior space of the carrier housing.

6. The connecting device according to any of the claim 1, wherein the control rod extends along a rod axis appreciably perpendicular to the axis of translation of each telescopic connecting system and can rotate freely around its rod axis.

7. The connecting device according to claim 6, wherein the actuating mechanism comprises a unique first portion suitable for actuating several telescopic connecting systems together, and the first portion of the actuating mechanism comprises a hub rotationally integral with the control rod, said hub being mechanically connected to elements movable in translation of the telescopic connecting systems by articulated rods.

8. The connecting device according to claim 1, wherein the at least one telescopic connecting system comprises a movable tubular element movable in translation with respect to said carrier housing and equipped with at least one inflatable seal.

9. The connecting device according to claim 8, wherein the movable tubular element presents an external diameter smaller than an internal diameter of a pipe to which it can be connected, and the inflatable seal is mounted on an external surface of the tubular element.

10. The connecting device according to claim 8, wherein the inflatable seal is supplied with fluid from a piping circuit comprising a flexible portion arranged in the carrier housing or near this latter, the piping circuit also comprising an external portion arranged outside the carrier housing and extending appreciably parallel to the control rod.

11. The connecting device according to claim 1, further comprising a positioning and guidance system comprising a frame suitable for supporting the carrier housing.

12. The connecting device according to claim 11, wherein the control system comprises a motor unit supported by the frame and suitable for rotationally actuating the control rod.

13. The connecting device according to claim 11, wherein the positioning and guidance system comprises telescopic positioning legs supporting the frame and equipped with remotely activated actuators in order to move the frame in an appreciably vertical direction.

* * * * *